US012581151B2

(12) United States Patent
    Xia et al.

(10) Patent No.: US 12,581,151 B2
(45) Date of Patent: Mar. 17, 2026

(54) BROADCAST TRANSLATOR FOR RECEIVING OFF-AIR RF SIGNALS AND RETRANSMITTING RF SIGNALS

(71) Applicant: Anywave Communication Technologies Inc., Vernon Hills, IL (US)

(72) Inventors: Pan Xia, Hawthorn Woods, IL (US); Yingying Fan, Hawthorn Woods, IL (US); Bowei Song, Hawthorn Woods, IL (US); Jingsong Xia, Hawthorn Woods, IL (US); Edward Karam, West Suffield, CT (US)

(73) Assignee: Anywave Broadcast Inc., Vernon Hills, IL (US)

( * ) Notice: Subject to any disclaimer, the term of this patent is extended or adjusted under 35 U.S.C. 154(b) by 0 days.

(21) Appl. No.: 18/635,588

(22) Filed: Apr. 15, 2024

(65) Prior Publication Data

US 2024/0348859 A1     Oct. 17, 2024

Related U.S. Application Data

(60) Provisional application No. 63/496,058, filed on Apr. 14, 2023.

(51) Int. Cl.
    *H04N 21/426* (2011.01)
    *H04N 21/434* (2011.01)
    *H04N 21/435* (2011.01)
    *H04N 21/438* (2011.01)
    (Continued)

(52) U.S. Cl.
    CPC ................. *H04N 21/42607* (2013.01); *H04N 21/4343* (2013.01); *H04N 21/435* (2013.01);

*H04N 21/4382* (2013.01); *H04N 21/47* (2013.01); *H04N 21/643* (2013.01)

(58) Field of Classification Search
    CPC ......... H04N 21/42607; H04N 21/4343; H04N 21/435; H04N 21/4382; H04N 21/47; H04N 21/643; H04N 21/6112
    See application file for complete search history.

(56) References Cited

U.S. PATENT DOCUMENTS

2022/0014575 A1* 1/2022 Corl .................... H04L 65/4076

FOREIGN PATENT DOCUMENTS

WO     WO-2017197341 A1 * 11/2017 ........... H04B 17/382

* cited by examiner

*Primary Examiner* — Anthony Bantamoi
(74) *Attorney, Agent, or Firm* — The Webb Law Firm

(57) ABSTRACT

A broadcast translator for receiving off-air radio-frequency (RF) signals and retransmitting RF signals may include a tuner and demodulator, a data analyzer, a data converter, and/or an exciter. The tuner and demodulated may be configured to receive an off-air RF signal and output demodulated data. The data analyzer may be configured to receive the demodulated data and analyze the demodulated data to generate new signaling information and control and configuration information. The data converter may be configured to receive the demodulated data and convert the demodulated data into output data packets. The exciter may be configured to receive the new signaling information and the control and configuration information and the output data packets and generate a new RF signal in a same or a different frequency as the off-air RF signal. The new RF signal may include the new signaling information and the control and configuration information.

20 Claims, 6 Drawing Sheets

(51) Int. Cl.
    *H04N 21/47*         (2011.01)
    *H04N 21/643*      (2011.01)

BROADCAST TRANSLATOR FOR RECEIVING OFF-AIR RF SIGNALS AND RETRANSMITTING RF SIGNALS

CROSS-REFERENCE TO RELATED APPLICATION

This application claims the priority of U.S. Provisional Patent Application No. 63/496,058 filed Apr. 14, 2023, the entire disclosure of which is hereby incorporated by reference in its entirety.

BACKGROUND

1. Field

This disclosure relates generally to broadcast translators and, in some non-limiting embodiments or aspects, to an Advanced Television Systems Committee (ATSC) 3.0 translator for receiving off-air ATSC 3.0 radio frequency (RF) signals and retransmitting RF signals via an antenna at a same or a different frequency as the off-air ATSC 3.0 RF signals.

2. Description of Related Art

The ATSC 3.0 broadcast standard for over the air delivery of television and other signals is being rolled out across the United States. This new standard offers significant improvements over the previous ATSC 1.0 standard, including support for Ultra-High-Definition (UHD) video, High Dynamic Range (HDR) content, and advanced audio codecs. However, the adoption of the new standard has been slow, and many broadcasters are still using the older (ATSC 1.0) standard, but with all of the technical benefits of the ATSC 3.0 standard, the conversion is progressing.

Many TV broadcasters have used broadcast translators for many years to extend the coverage of their programming. Broadcast translators work by receiving the off-air signal of a main TV station and rebroadcasting the signal to an area that is typically not reached by the main transmitter. This may be particularly useful in areas with mountainous terrain, where the mountains block the path of the main transmitter signal. A broadcast translator can overcome this blockage by being located on top of the mountain and broadcasting the repeated signal to the underserved area. A broadcast translator may broadcast on a different channel than the main transmitter, but the content is typically identical. Nearly all of the TV broadcast translators to date are still using the ATSC 1.0 standard, but there is significant interest in ATSC 3.0 translators, as they will inevitably be needed, once main transmitters convert to ATSC 3.0.

Currently, in order to reuse and retransmit an existing off-air ATSC 3.0 signal with signaling changes, the broadcasters and transmitter sites use multiple devices: a receiver to receive the off-air signal, a gateway that can support and receive the demodulated data from the receiver, analyze the signal and re-generate the signaling information, and finally reformat it and multiplex them into an Internet Protocol (IP) stream, such as a Studio-to-Transmitter Link Transport Protocol (STLTP) signal, which is the predefined transport protocol in the ATSC 3.0 standard. This allows the signal to be sent to a standard ATSC 3.0 exciter. The ATSC 3.0 exciter receives the IP stream (e.g., the STLTP signal), and extracts the IP stream back into baseband streams and signaling, before modulating the data into the new RF signal for retransmission. Since the multiple devices (e.g., a receiver, a gateway, an exciter, etc.) used for this application are each separate, stand-alone devices, the intercommunications among the multiple devices need to follow the ATSC 3.0 standards and all data delivery must be according to the pre-defined transport protocols, such as Data Source Transport Protocol (DSTP), ALPTP, and STLTP, to guarantee reliable delivery. Taking the data delivery from the gateway to the exciter as an example, the gateway first turns the ATSC Link Layer Protocols (ALPs) data into Baseband Packets (BBPs), then together with the preamble information and Timing and Management (T&M) information, in order to send the BBPs, the preamble information, and the T&M information the exciter side, the BBPs, the preamble information, and the T&M information are converted and multiplexed into STLTP format which is based on RTP/UDP/IP. On the exciter side, the exciter receives the STLTP data and demultiplexes and re-converts the STLTP data back to BBP, preamble, and T&M information for further processing in the exciter. Accordingly, existing devices not only have significant cost, but also introduce a complicated back-and-forth conversion of data. Therefore, such devices may create potential problems, and are difficult to install, setup, and maintain.

SUMMARY

Accordingly, provided are improved broadcast translators, systems, and methods for receiving off-air radio frequency (RF) signals and retransmitting RF signals. For example, some non-limiting embodiments or aspects of the present disclosure may provide an "all-in-one" solution ATSC 3.0 translator that receives off-air ATSC 3.0 RF signals and retransmit RF signals via an antenna at a same or a different frequency than the off-air ATSC 3.0 RF signals. The new transmitted signal (e.g., the retransmitted RF signals, etc.) may be ATSC 3.0 compatible and may have modified signaling information including, but not limited to, service ID, short service name, major channel number, minor channel number, any combination thereof, and/or the like, compared to that in the received RF signal, such that the new transmitted signal is not only more convenient for use in local applications, but it can also reduce a need to purchase expensive front-end equipment for signaling regeneration. Further, because some non-limiting embodiments or aspects of the present disclosure may provide an "all-in-one" device, in which all functions are implemented internally, non-limiting embodiments or aspects of the present disclosure may greatly reduce the need to convert the data back and forth into different transport protocols for signals to be transmitted among devices and layers (e.g., between the transport layer and the physical layer, etc.), thereby decreasing an overall process effort and time. Moreover, some non-limiting embodiments or aspects of the present disclosure have been simplified and/or have fewer breakpoints, thereby making them more reliable. Also, some non-limiting embodiments or aspects of the present disclosure may reduce a likelihood of data loss or breaches and/or enable easier installation, setup, and/or maintenance.

According to non-limiting embodiments or aspects, provided is a broadcast translator for receiving off-air radio-frequency (RF) signals and retransmitting RF signals, the broadcast translator including: a tuner and demodulator configured to receive an off-air RF signal and output demodulated data; a data analyzer operatively coupled to the tuner and demodulator, wherein the data analyzer is configured to receive the demodulated data and analyze the demodulated data to generate new signaling information and control and configuration information; a data converter operatively coupled to the tuner and demodulator and the data analyzer, wherein the data converter is configured to receive the demodulated data and convert the demodulated data into output data packets; and an exciter operatively coupled to the data analyzer and the data converter, wherein the exciter is configured to receive the new signaling information and the control and configuration information from the data analyzer and the output data packets from the data converter and generate a new RF signal in a same or a different frequency as the off-air RF signal received by the tuner and demodulator, wherein the new RF signal includes the new signaling information and the control and configuration information.

In some non-limiting embodiments or aspects, signaling information included in the off-air RF signal includes at least one of the following: a Link Mapping Table (LMT), a Service List Table (SLT), a service ID, a short service name, a major channel number, a minor channel number, or any combination thereof, and wherein the new signaling information includes at least one of the following: a different LMT than the LMT included in the signaling information, a different SLT than the SLT included in the signaling information, a different service ID than the service ID included in the signaling information, a different short service name than the short service name included in the signaling information, a different major channel number than the major channel number included in the signaling information, a different minor channel number than the minor channel number included in the signaling information, or any combination thereof.

In some non-limiting embodiments or aspects, the data analyzer is configured to generate the control and configuration information by retrieving the control and configuration information from the demodulated data, and wherein the data analyzer is configured to provide the control and configuration information to the data converter.

In some non-limiting embodiments or aspects, the broadcast translator further includes: a user interface configured to user input from a user, wherein the data analyzer is configured to generate the control and configuration information based on the user input, and wherein the data analyzer is configured to provide the control and configuration information to the data converter.

In some non-limiting embodiments or aspects, the demodulated data is in an Advanced Television Systems Committee (ATSC) Link Layer Protocol (ALP) format, and wherein the tuner and demodulator is configured to provide the demodulated data directly to the data analyzer and the data converter in the ALP format.

In some non-limiting embodiments or aspects, the output data packets include Baseband Packets (BBPs), wherein the data converter is configured to provide the demodulated data in the ALP format to a plurality of ALP groups according to the control and configuration information, wherein the data converter is configured to convert the demodulated data in the plurality of ALP groups into the BBPs, and wherein the data converter is configured to provide the BBPs directly to the exciter.

In some non-limiting embodiments or aspects, the off-air RF signal includes an Advanced Television Systems Committee (ATSC) 3.0 RF signal.

In some non-limiting embodiments or aspects, the tuner and demodulator include at least one of the following: at least one antenna input, an input filter, a pre-amplifier configured to amplify the off-air RF signal, a tuner circuit, or any combination thereof.

In some non-limiting embodiments or aspects, each of the tuner and demodulator, the data analyzer, the data converter, and the exciter are integrated within one single device.

In some non-limiting embodiments or aspects, the broadcast translator further includes: an antenna configured to at least one of receive the off-air RF signal, transmit the new RF signal, or any combination thereof.

According to some non-limiting embodiments or aspects, provided is a method for receiving off-air radio-frequency (RF) signals and retransmitting RF signals, including: receiving an off-air RF signal;

tuning and demodulating the off-air RF signal to generate demodulated data;

analyzing the demodulated data to generate new signaling information and control and configuration information; converting the demodulated data into output data packets; and generating, based on the new signaling information, the control and configuration information, and the output data packets, a new RF signal in a same or a different frequency as the off-air RF signal, wherein the new RF signal includes the new signaling information and the control and configuration information.

In some non-limiting embodiments or aspects, signaling information included in the off-air RF signal includes at least one of the following: a Link Mapping Table (LMT), a Service List Table (SLT), a service ID, a short service name, a major channel number, a minor channel number, or any combination thereof, and wherein the new signaling information includes at least one of the following: a different LMT than the LMT included in the signaling information, a different SLT than the SLT included in the signaling information, a different service ID than the service ID included in the signaling information, a different short service name than the short service name included in the signaling information, a different major channel number than the major channel number included in the signaling information, a different minor channel number than the minor channel number included in the signaling information, or any combination thereof.

In some non-limiting embodiments or aspects, analyzing the demodulated data to generate new signaling information and control and configuration information includes retrieving the control and configuration information from the demodulated data.

In some non-limiting embodiments or aspects, analyzing the demodulated data to generate new signaling information and control and configuration information further includes: receiving user input from a user; and generating the control and configuration information based on the user input.

In some non-limiting embodiments or aspects, the demodulated data is in an Advanced Television Systems Committee (ATSC) Link Layer Protocol (ALP) format.

In some non-limiting embodiments or aspects, the output data packets include Baseband packets (BBPs), wherein converting the demodulated data into output data packets includes providing the demodulated data in the ALP format to a plurality of ALP groups according to the control and configuration information and converting the demodulated data in the plurality of ALP groups into the BBPs.

In some non-limiting embodiments or aspects, the off-air RF signal includes an Advanced Television Systems Committee (ATSC) 3.0 RF signal.

In some non-limiting embodiments or aspects, the method further includes: transmitting the new RF signal including the new signaling information and the control and configuration information.

According to some non-limiting embodiments or aspects, provided is a system for receiving off-air radio-frequency (RF) signals and retransmitting RF signals, the system including: a tuner and demodulator configured to receive an off-air ATSC 3.0 RF signal and output demodulated data in an ATSC Link Layer Protocol (ALP) format; a data analyzer operatively coupled to the tuner and demodulator, wherein the data analyzer is configured to receive the demodulated data in the ATSC ALP format and analyze the demodulated data in the ATSC ALP format to generate new signaling information and control and configuration information; a data converter operatively coupled to the tuner and demodulator and the data analyzer, wherein the data converter is configured to receive the demodulated data in the ATSC ALP format and convert the demodulated data into Baseband Packets (BBPs); and an exciter operatively coupled to the data analyzer and the data converter, wherein the exciter is configured to receive the new signaling information and the control and configuration information from the data analyzer and the BPPs from the data converter and generate a new ATSC 3.0 RF signal in a same or a different frequency as the off-air ATSC 3.0 RF signal received by the tuner and demodulator, wherein the new ATSC 3.0 RF signal includes the new signaling information and the control and configuration information.

In some non-limiting embodiments or aspects, each of the tuner and demodulator, the data analyzer, the data converter, and the exciter are integrated within one single device.

Further non-limiting embodiments or aspects are set forth in the following numbered clauses:

Clause 1: A A broadcast translator for receiving off-air radio-frequency (RF) signals and retransmitting RF signals, the broadcast translator comprising: a tuner and demodulator configured to receive an off-air RF signal and output demodulated data; a data analyzer operatively coupled to the tuner and demodulator, wherein the data analyzer is configured to receive the demodulated data and analyze the demodulated data to generate new signaling information and control and configuration information; a data converter operatively coupled to the tuner and demodulator and the data analyzer, wherein the data converter is configured to receive the demodulated data and convert the demodulated data into output data packets; and an exciter operatively coupled to the data analyzer and the data converter, wherein the exciter is configured to receive the new signaling information and the control and configuration information from the data analyzer and the output data packets from the data converter and generate a new RF signal in a same or a different frequency as the off-air RF signal received by the tuner and demodulator, wherein the new RF signal includes the new signaling information and the control and configuration information.

Clause 2: The broadcast translator of clause 1, wherein signaling information included in the off-air RF signal includes at least one of the following: a Link Mapping Table (LMT), a Service List Table (SLT), a service ID, a short service name, a major channel number, a minor channel number, or any combination thereof, and wherein the new signaling information includes at least one of the following: a different LMT than the LMT included in the signaling information, a different SLT than the SLT included in the signaling information, a different service ID than the service ID included in the signaling information, a different short service name than the short service name included in the signaling information, a different major channel number than the major channel number included in the signaling information, a different minor channel number than the minor channel number included in the signaling information, or any combination thereof Clause 3: The broadcast translator of clause 1 or 2, wherein the data analyzer is configured to generate the control and configuration information by retrieving the control and configuration information from the demodulated data, and wherein the data analyzer is configured to provide the control and configuration information to the data converter.

Clause 4: The broadcast translator of any of clauses 1-3, further comprising: a user interface configured to user input from a user, wherein the data analyzer is configured to generate the control and configuration information based on the user input, and wherein the data analyzer is configured to provide the control and configuration information to the data converter.

Clause 5: The broadcast translator of any of clauses 1-4, wherein the demodulated data is in an Advanced Television Systems Committee (ATSC) Link Layer Protocol (ALP) format, and wherein the tuner and demodulator is configured to provide the demodulated data directly to the data analyzer and the data converter in the ALP format.

Clause 6: The broadcast translator of any of clauses 1-5, wherein the output data packets include Baseband Packets (BBPs), wherein the data converter is configured to provide the demodulated data in the ALP format to a plurality of ALP groups according to the control and configuration information, wherein the data converter is configured to convert the demodulated data in the plurality of ALP groups into the BBPs, and wherein the data converter is configured to provide the BBPs directly to the exciter.

Clause 7: The broadcast translator of any of clauses 1-6, wherein the off-air RF signal includes an Advanced Television Systems Committee (ATSC) 3.0 RF signal.

Clause 8: The broadcast translator of any of clauses 1-7, wherein the tuner and demodulator include at least one of the following: at least one antenna input, an input filter, a pre-amplifier configured to amplify the off-air RF signal, a tuner circuit, or any combination thereof.

Clause 9: The broadcast translator of any of clauses 1-8, wherein each of the tuner and demodulator, the data analyzer, the data converter, and the exciter are integrated within one single device.

Clause 10: The broadcast translator of any of clauses 1-9, further comprising: an antenna configured to at least one of receive the off-air RF signal, transmit the new RF signal, or any combination thereof.

Clause 11: A method for receiving off-air radio-frequency (RF) signals and retransmitting RF signals, comprising: receiving an off-air RF signal; tuning and demodulating the off-air RF signal to generate demodulated data; analyzing the demodulated data to generate new signaling information and control and configuration information; converting the demodulated data into output data packets; and generating, based on the new signaling information, the control and configuration information, and the output data packets, a new RF signal in a same or a different frequency as the off-air RF signal, wherein the new RF signal includes the new signaling information and the control and configuration information.

Clause 12: The method of clause 11, wherein signaling information included in the off-air RF signal includes at least one of the following: a Link Mapping Table (LMT), a Service List Table (SLT), a service ID, a short service name, a major channel number, a minor channel number, or any combination thereof, and wherein the new signaling information includes at least one of the following: a different LMT than the LMT included in the signaling information, a different SLT than the SLT included in the signaling information, a different service ID than the service ID included in the signaling information, a different short service name than the short service name included in the signaling information, a different major channel number than the major channel number included in the signaling information, a different minor channel number than the minor channel number included in the signaling information, or any combination thereof.

Clause 13: The method of claim 11 or 12, wherein analyzing the demodulated data to generate new signaling information and control and configuration information includes retrieving the control and configuration information from the demodulated data.

Clause 14: The method of any of clauses 11-13, wherein analyzing the demodulated data to generate new signaling information and control and configuration information further includes: receiving user input from a user; and generating the control and configuration information based on the user input.

Clause 15: The method of any of clauses 11-14, wherein the demodulated data is in an Advanced Television Systems Committee (ATSC) Link Layer Protocol (ALP) format.

Clause 16: The method of any of clauses 11-15, wherein the output data packets include Baseband packets (BBPs), wherein converting the demodulated data into output data packets includes providing the demodulated data in the ALP format to a plurality of ALP groups according to the control and configuration information and converting the demodulated data in the plurality of ALP groups into the BBPs.

Clause 17: The method of any of clauses 11-16, wherein the off-air RF signal includes an Advanced Television Systems Committee (ATSC) 3.0 RF signal.

Clause 18: The method of any of clauses 11-17, further comprising: transmitting the new RF signal including the new signaling information and the control and configuration information.

Clause 19: A system for receiving off-air radio-frequency (RF) signals and retransmitting RF signals, the system comprising: a tuner and demodulator configured to receive an off-air ATSC 3.0 RF signal and output demodulated data in an ATSC Link Layer Protocol (ALP) format; a data analyzer operatively coupled to the tuner and demodulator, wherein the data analyzer is configured to receive the demodulated data in the ATSC ALP format and analyze the demodulated data in the ATSC ALP format to generate new signaling information and control and configuration information; a data converter operatively coupled to the tuner and demodulator and the data analyzer, wherein the data converter is configured to receive the demodulated data in the ATSC ALP format and convert the demodulated data into Baseband Packets (BBPs); and an exciter operatively coupled to the data analyzer and the data converter, wherein the exciter is configured to receive the new signaling information and the control and configuration information from the data analyzer and the BPPs from the data converter and generate a new ATSC 3.0 RF signal in a same or a different frequency as the off-air ATSC 3.0 RF signal received by the tuner and demodulator, wherein the new ATSC 3.0 RF signal includes the new signaling information and the control and configuration information.

Clause 20: The system of clause 19, wherein each of the tuner and demodulator, the data analyzer, the data converter, and the exciter are integrated within one single device.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
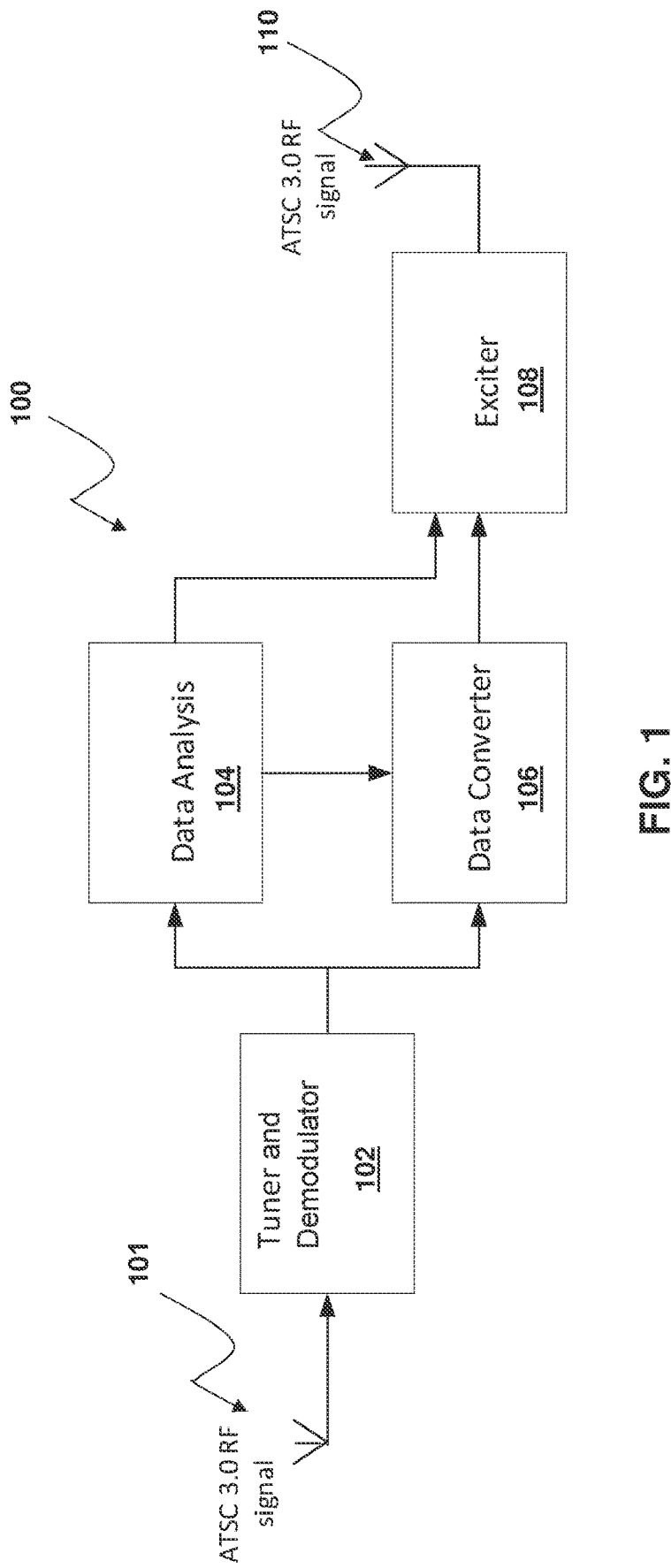
FIG. 1 is a block diagram of a broadcast translator, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and provides or communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

Some non-limiting embodiments or aspects of the present disclosure may provide an "all-in-one" solution for a broadcast translator (e.g., an ATSC 3.0 translator, etc.) with built-in functional blocks that enable the broadcast translator to receive off-air RF signals (e.g., off-air ATSC 3.0 signals, etc.) and retransmit RF signals via an antenna at a same or a different frequency than the off-air RF signals. Non-limiting embodiments or aspects of the present disclosure may extend a functionality of a standard exciter platform (e.g., a standard ATSC 3.0 exciter platform, etc.) by enabling an exciter to receive other data sources, such as the off-air ATSC 3.0 RF signal, and/or the like alternatively to or in addition to standard exciter input formats (e.g., STLTP data, etc.) from an ATSC 3.0 broadcast gateway.

Referring now to FIG. 1, shown is a block diagram of a broadcast translator 100, according to some non-limiting embodiments or aspects. As shown in FIG. 1, the broadcast translator 100 (e.g., ATSC 3.0 translator, etc.) may include an antenna 101, a Tuner and Demodulator Block or circuitry (e.g., a tuner and demodulator, etc.) 102, a Data Analysis Block or circuitry (e.g., a data analyzer, etc.) 104, a Data Converter Block or circuitry (e.g., a data converter, etc.) 106, an Exciter Block or circuitry (e.g., an exciter, etc.) 108, and/or an antenna 110. The Data Analysis Block or circuitry 104 may be operatively coupled to the Tuner and Demodulator Block or circuitry 102. The Data Converter Block or circuitry 106 may be operatively coupled to the Tuner and Demodulator Block or circuitry 102 and/or the Data Analysis Block or circuitry 104. The Exciter Block or circuitry 108 may be operatively coupled to the Data Analysis Block or circuitry 104 and/or the Data Converter Block or circuitry 106. Each of the Tuner and Demodulator Block or circuitry 102, the Data Analysis Block or circuitry 104, the Data Converter Block or circuitry 106, and/or the Exciter Block or circuitry 108 may be integrated within a single device (e.g., within one device, within a housing of a single device, within a single integrated circuit (IC), within a single programmable logic controller (PLC), within a single printed circuit board (PCB), etc.). In some non-limiting embodiments or aspects, the antenna 101 may be a same antenna as the antenna 110 or a different antenna than antenna 110.

In some non-limiting embodiments or aspects, each of the above described functional blocks or circuitry (e.g., each of the Tuner and Demodulator Block or circuitry 102, the Data Analysis Block or circuitry 104, the Data Converter Block or circuitry 106, and/or the Exciter Block or circuitry 108, etc.) may be implemented by one or more computing devices and/or one or more processors and memory. In some non-limiting embodiments or aspects, the one or more processors may be implemented in hardware, firmware, or a combination of hardware and software. For example, the one or more processors may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), a device configured to implement logic functions, etc.) that can be programmed to perform a function. The memory may include random access memory (RAM), read-only memory (ROM), and/or another type of dynamic or static storage memory (e.g., flash memory, magnetic memory, optical memory, etc.) that stores information and/or instructions for use by the one or more processors.

The Tuner and Demodulator Block 102 may be configured to receive a RF signal (e.g., a broadcast signal, an off-air RF signal, an off-air ATSC 3.0 signal, etc.) and output demodulated data (e.g., a demodulated signal, etc.) to the Data Analysis Block 104 and/or the Data Converter Block 106. For example, the Tuner and Demodulator Block 102 may be configured to tune and demodulate the RF signal to generate the demodulated data. The RF signal may be received via an antenna 101 operatively coupled to the Tuner and Demodulator Block 102.

The RF signal may include media information (e.g., audio and/or video information, etc.), signaling information, control and configuration information, any combination thereof, and/or the like. The signaling information may include a Link Mapping Table (LMT), a Service List Table (SLT), or the like, which may include a service ID, a short service name, a major channel number, a minor channel number, any combination thereof, and/or the like. The control and configuration information may include preamble data, Timing & Management data, any combination thereof, and/or the like.

Figure 2:
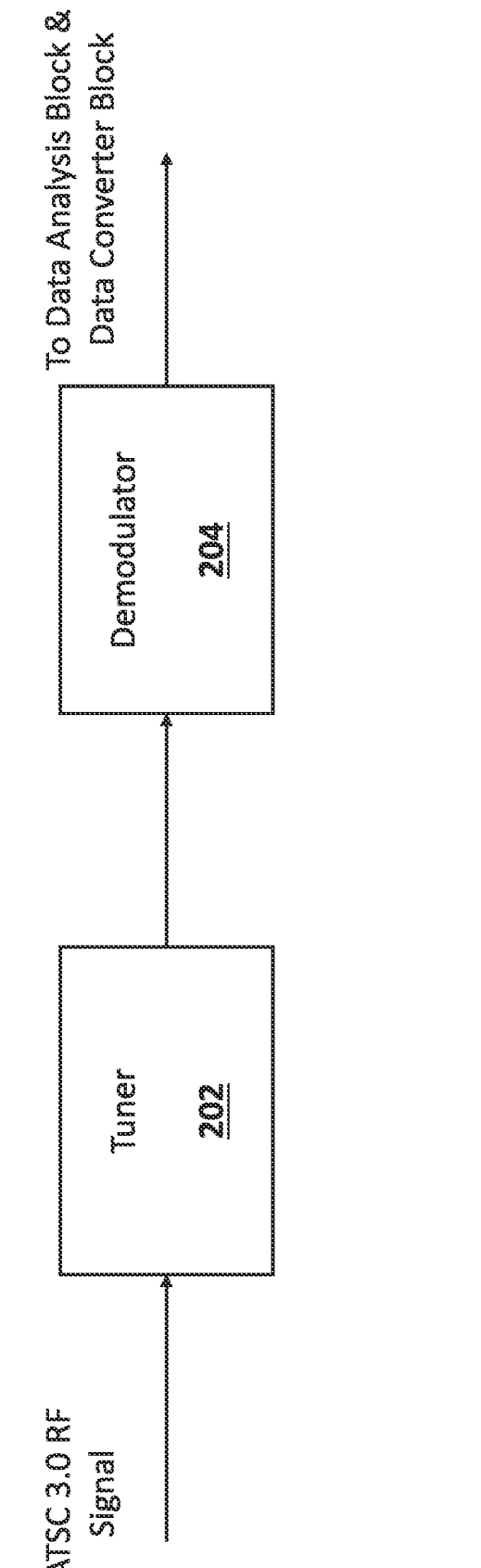
FIG. 2 is a block diagram of example components of a tuner and demodulator of the broadcast translator of FIG. 1, according to some non-limiting embodiments or aspects.

Further details regarding non-limiting embodiments or aspects of the Tuner and Demodulator Block or circuitry (e.g., the tuner and demodulator, etc.) 102 are provided herein with reference to FIG. 2.

The Data Analysis Block 104 may be configured to receive the demodulated data from the Tuner and Demodulator Block 102 and analyze or process the demodulated data to retrieve information (e.g., the signaling information, the control and configuration information, etc.) and/or generate new signaling information (e.g., different signaling information than the signaling information retrieved from the demodulated data, etc.) and/or new control and configuration information (e.g., different control and configuration information than the control and configuration information retrieved from the demodulated data, etc.). For example, the new signaling information may include a different SLT, a different LMT, a different service ID, a different short service name, a different major channel number, a different minor channel number, any combination thereof, and/or the like than an SLT, an LMT, a service ID, a short service name, a major channel number, a minor channel number, any combination thereof, and/or the like of the signaling information retrieved from the demodulated data. As an example, the new control and configuration information may include different preamble data, Timing & Management data, any combination thereof, and/or the like than the preamble data, Timing & Management data, any combination thereof, and/or the like included in the original control and configuration information.

Figure 3:
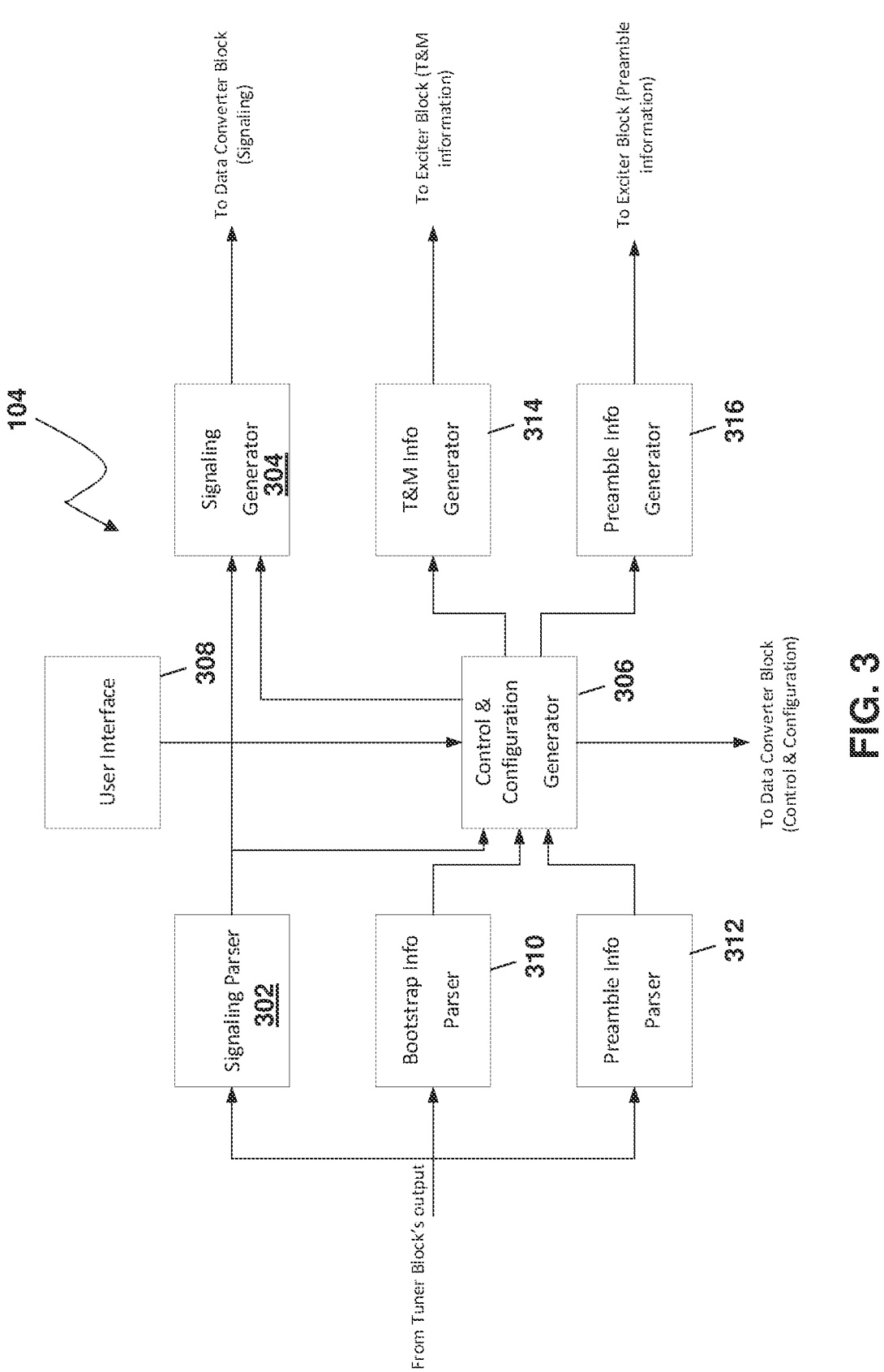
FIG. 3 is a block diagram of example components of a data analyzer of the broadcast translator of FIG. 1, according to some non-limiting embodiments or aspects.

Further details regarding non-limiting embodiments or aspects of the Data Analysis Block or circuitry (e.g., a data analyzer, etc.) 104 are provided herein with reference to FIG. 3.

The Data Converter Block 106 may be configured to receive the demodulated data from the Tuner and Demodulator Block 102 and convert the demodulated data into output data packets (e.g., Baseband Packets (BBPs), etc.)

Figure 4:
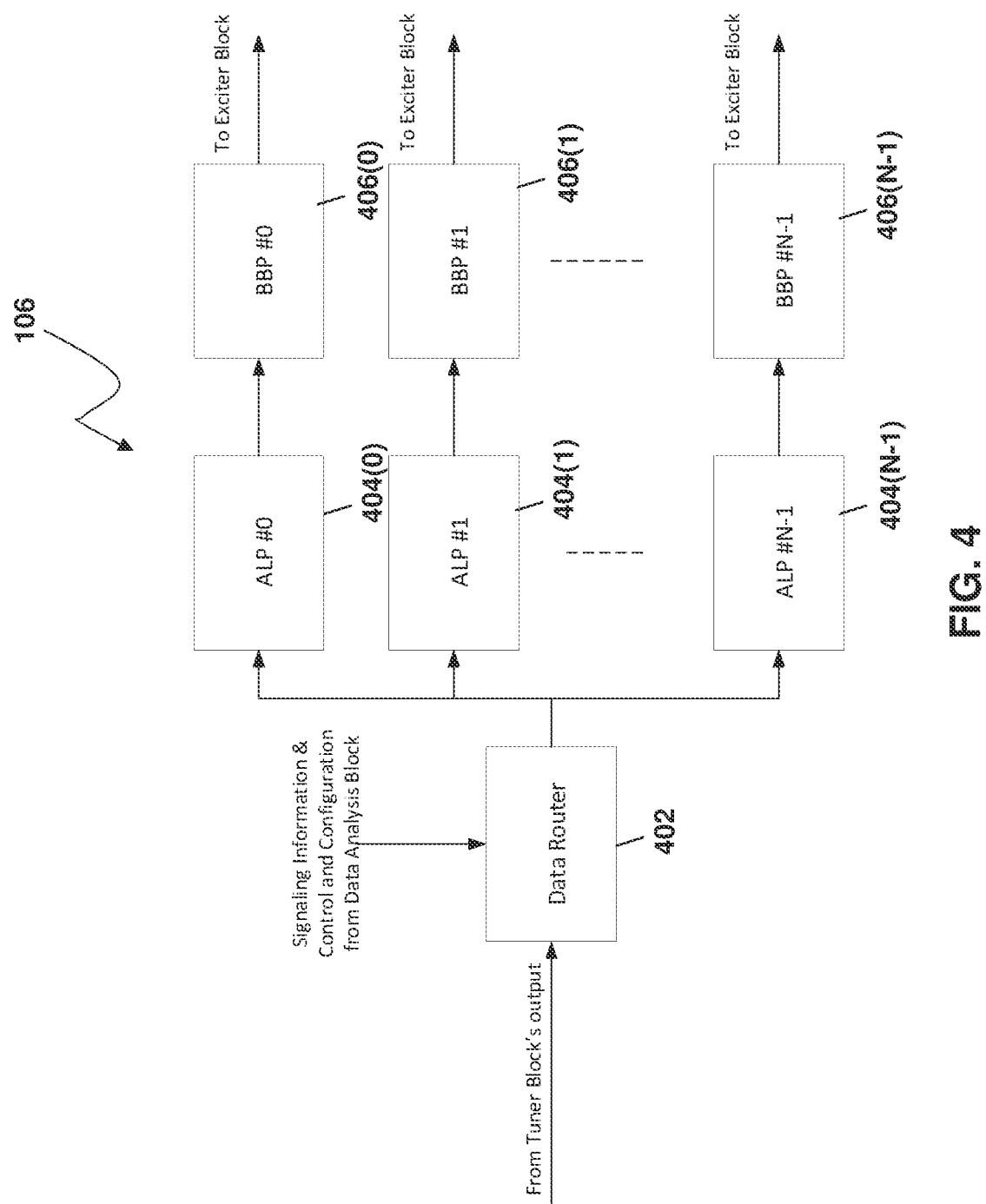
FIG. 4 is a block diagram of example components of a data converter of the broadcast translator of FIG. 1, according to some non-limiting embodiments or aspects.

Further details regarding non-limiting embodiments or aspects of the Data Converter Block or circuitry (e.g., a data converter, etc.) 106 are provided herein with reference to FIG. 4.

The Exciter Block 108 may be configured to receive the output data packets (e.g., the BBPs, etc.) from the Data Converter Block 106 and/or the signaling information, the new signaling information, the control and configuration information, and/or the new control and configuration information from the Data Analysis Block 104 and generate a new RF signal in a same or a different frequency as the RF signal received by the Tuner and Demodulator Block 102 and/or the antenna 101. The new RF signal may be retransmitted by an antenna 110. The new RF signal may include the new signaling information and the control and configuration information (and/or the new control and configuration information), as needed.

Figure 5:
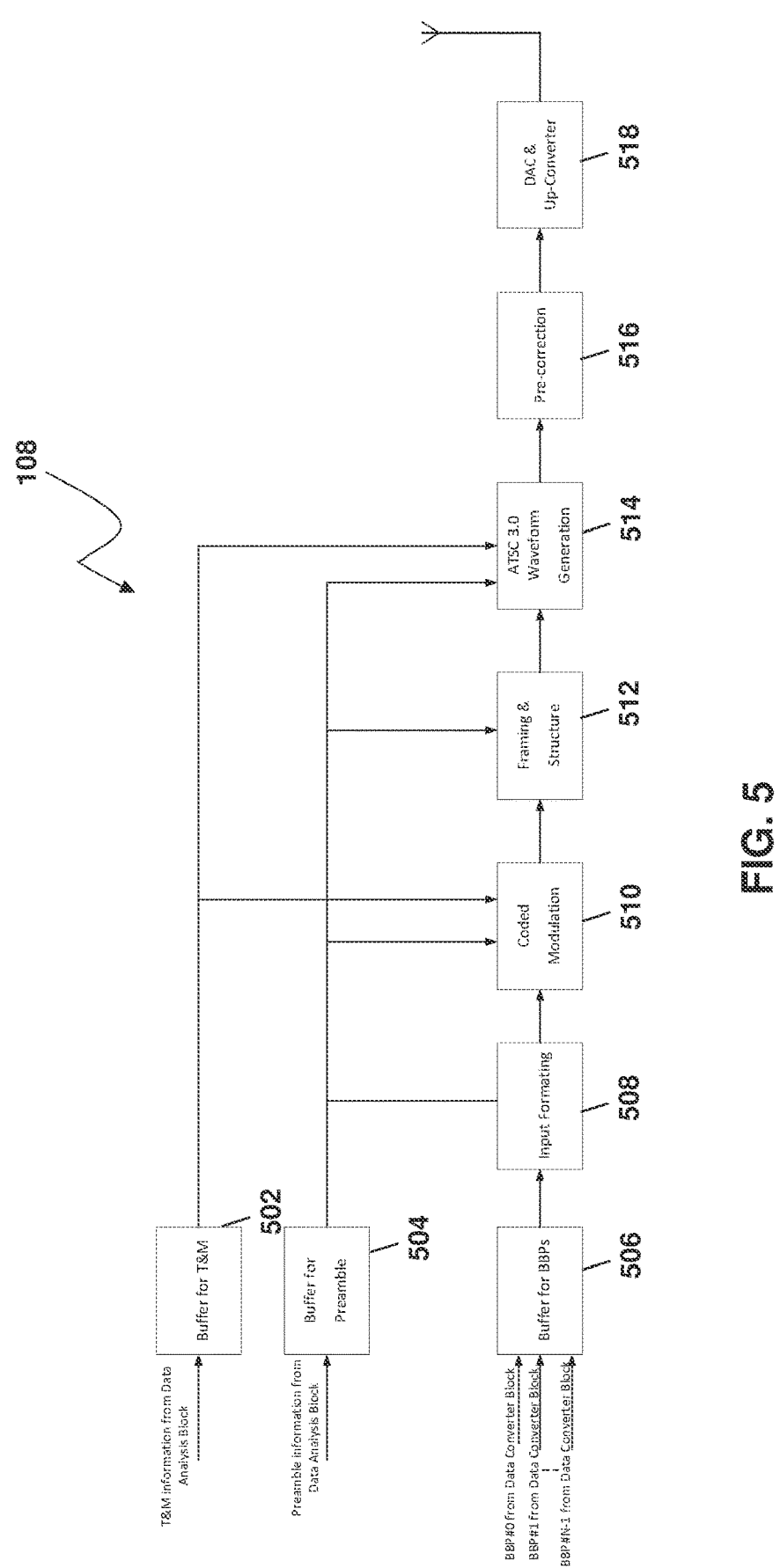
FIG. 5 is a block diagram of example components of an exciter of the broadcast translator of FIG. 1, according to some non-limiting embodiments or aspects.

Further details regarding non-limiting embodiments or aspects of the Exciter Block or circuitry (e.g., an exciter, etc.) 108 are provided herein with reference to FIG. 5.

Referring now to FIG. 2, shown is a block diagram of example components of the Tuner and Demodulator Block or circuitry (e.g., the tuner and demodulator, etc.) 102 of the broadcast translator 100 of FIG. 1, according to some non-limiting embodiments or aspects. As shown in FIG. 2, the Tuner and Demodulator Block 102 may include a Tuner 202 and a Demodulator 204. The Tuner and Demodulator Block 102 may include one or more of: antenna inputs (e.g., via antenna 101, etc.), an input filter, a pre-amplifier to amplify the received RF signal, a tuner circuit, any combination thereof, and/or the like. The tuner 202 may be operatively coupled to the demodulator 204. The tuner 202 may be configured to receive the RF signal (e.g., the broadcast signal, the off-air RF signal, the off-air ATSC 3.0 signal, etc.) via the antenna 101 and/or the demodulator may be configured to demodulate the received RF signal to generate the demodulated data, which may be demodulated according to and/or compliant with the ATSC 3.0 standards, such as ATSC Link Layer Protocol (ALP) data, and/or the like. The demodulator 204 may be configured to output the demodulated data to the Data Analysis Block 104 and/or the Data Converter Block 106.

Referring now to FIG. 3, shown is a block diagram of example components of the Data Analysis Block or circuitry (e.g., the data analyzer, etc.) 104 of the broadcast translator 100 of FIG. 1, according to some non-limiting embodiments or aspects. As shown in FIG. 3, the Data Analysis Block 104 may include a Signaling Parser 302, a Signaling Generator 304, a Control & Configuration Generator 306, a User Interface 308, a Bootstrap Information Parser 310, a Preamble Information Parser 312, a Timing & Management (T&M) Information Generator 314, and/or a Preamble Information Generator 316. The Signaling Parser 302 may be operatively coupled to the Tuner and Demodulator Block 102, the Signaling Generator 304, and/or the Control & Configuration Generator 306. The Signaling Generator 304 may be operatively coupled to the Signaling Parser 302, the Control & Configuration Generator 306, and/or the Data Converter Block 106. The Control & Configuration Generator 306 may be operatively coupled to the Signaling Parser 302, the Signaling Generator 304, the User Interface 308, the Bootstrap Information Parser 310, the Preamble Information Parser 312, the T&M Information Generator 314, the Preamble Information Generator 316, and/or the Data Converter Block 106. The Bootstrap Information Parser 310 may be operatively coupled to the Tuner and Demodulator Block 102 and/or the Control & Configuration Generator 306. The Preamble Information Parser 312 may be operatively coupled to the Tuner and Demodulator Block 102 and/or the Control & Configuration Generator 306. The T&M Information Generator 314 may be operatively coupled to the Control & Configuration Generator 306 and/or the Exciter Block 108. The Preamble Information Generator 316 may be operatively coupled to the Control & Configuration Generator 306 and/or the Exciter Block 108.

The Data Analysis Block 104 may be configured to receive the demodulated data (e.g., the ALP data, etc.) from the Tuner and Demodulator Block 102 and analyze the demodulated data to retrieve information from the demodulated data, such as the signaling information, the control and configuration information, the Preamble information, the Bootstrap information, any combination thereof, and/or the like. The Data Analysis Block 104 may be configured to regenerate the new signaling information and/or the control and configuration information and send the new signaling information and/or the control and configuration information to the Data Converter Block 106. The Data Analysis Block 104 may be configured to generate the T&M information and/or the Preamble information and provide or communicate the T&M information and/or the Preamble information to the Exciter Block 108.

For example, the Signaling Parser 302 may be configured to receive the demodulated data from the Tuner and Demodulator Block 102. The Signaling Parser 302 may be configured to analyze and extract the signaling information (e.g., an SLT, an LMT, etc.) and/or the control and configuration information from the demodulated data. The Signaling Parser 302 may be configured to provide or communicate the extracted signaling information, and the control and configuration information, thereof to the Signaling Generator 304 and/or the Control & Configuration Generator 306.

The Signaling Generator 304 may be configured to receive the extracted signaling information from the Signaling Parser 302 and/or new control and configuration information from the Control & Configuration Generator 306. The Signaling Generator 304 may be configured to generate the new signaling information (e.g., a new SLT, a new LMT, etc.) according to or as instructed by new control and configuration information received from the Control & Configuration Generator 306. The Signaling Generator 304 may be configured to provide or communicate the new signaling information to the Data Converter Block 106 (e.g. to be regrouped into some of the ALPs data, etc.). In such an example, the newly regenerated signaling information may include an SLT, an LMT, a service ID, a short service name, a major channel number, a minor channel number, other information used by the application, any combination thereof, and/or the like.

The Control and Configuration Generator 306 may be configured to receive the extracted signaling information, the control and configuration information, and/or the analysis thereof from the Signal Parser 302, bootstrap information from the Bootstrap Information Parser 310, preamble information from the Preamble Information Parser 312, and/or user input used for generating the new control and configuration information from the User Interface 308. For example, the Control and Configuration Generator 306 may be configured to retrieve the control and configuration information from the demodulated data and provide or communicate the control and configuration information to the Signaling Generator 304 (and on to the Data Converter Block 106) for control and configuration of the Signaling Generator 304 (and the Data Converter Block 106). Alternatively, Control and Configuration Generator 306 may be configured to generate the new control and configuration information according to user input received via the User Interface 308. For example, User Interface 308 may be configured to enable a user to either locally or remotely, manually enter or edit the new control and configuration information to be used, which provides for more flexibility for the application. As an example, the User Interface 308 may receive user input via the User Interface 308 to be used as the new control and configuration information and/or to be used by Control and Configuration Generator 306 to generate the new control and configuration information.

The Control & Configuration Generator 306 may be configured to control the T&M Information Generator 314 and/or Preamble Information Generator 316 to regenerate the T&M information and/or the preamble information. Preamble information may be constructed in the Preamble Generator according to instructions from the Control & Configuration Generator. The preamble information may be output by the Preamble Generator in the form of RTP/UDP/IP Multicast packets, which may be the same as or similar to those used to carry Baseband Packets (BBPs) in PLP Streams. The Preamble Stream may carry a description of the configuration of the exciter processing functions and/or the resulting emitted waveform that is identical to the Preamble data structure sent to receivers. Timing and Management (T&M) information may be constructed in the Timing and Management Generator according to instructions from the Control & Configuration Generator. The T&M information may be output by the Timing and Management Generator in the form of RTP/UDP/IP multicast packets, which may be the same as or similar to those used to carry Baseband Packets (BBPs) in PLP Streams. The resulting Timing and Management Stream may carry a set of instructions for controlling the emission of Physical Layer frames comprising a Bootstrap, Preamble, and Baseband Packets. Configurations of Bootstraps and certain other components of the Physical Layer frames are carried in the Timing and Management Stream. Also included in the Timing and Management Stream are the emission time of each Bootstrap and, hence, the start of each Physical Layer frame, the offset times of each Transmitter in an SFN from the Bootstrap Reference Emission Times for the Network, and other information used to control the Transmitter(s).

The Bootstrap Information Parser 310 may be configured to receive the demodulated data from the Tuner and Demodulator Block 102. The Bootstrap Information Parser 310 may be configured to analyze bootstrap information included in the demodulated data received from the Tuner and Demodulator Block 102 and/or provide or communicate the bootstrap information thereof to the Control & Configuration Generator 306. Bootstrap information may include a defined sequence of symbols that introduces each Physical Layer frame and provides a universal entry point into a digital transmission signal. Each Bootstrap may carry a value that serves as an indicator of the format of an immediately following Preamble symbol. Bootstrap signaling includes ea_wake_up, system_bandwidth, bsr_coefficient and preamble_structure. The bootstrap information may be used to generate the new T&M and preamble information in T&M Information Generator 314 and Preamble Information Generator 316. Control and Configuration Generator 306 may function as a control/configuration manager to gather each of these information types and control other functional blocks including Signaling Generator 304, T&M Information Generator 314 and Preamble Information Generator 316.

The Preamble Information Parser 312 may be configured to receive the demodulated data from the Tuner and Demodulator Block 102. The Preamble Information Parser 312 may be configured to analyze preamble information included in the demodulated data received from the Tuner and Demodulator Block 102 and/or provide or communicate the preamble information thereof to the Control & Configuration Generator 306.

The T&M Information Generator 314 may be configured to regenerate the T&M information and provide or communicate the T&M information to Exciter Block 108. For example, the T&M information and the preamble information may be (re) generated as defined in the ATSC 3.0 standard. As an example, the T&M information and the preamble information may be generated in the gateway and transmitted in the air as an RF signal, and T&M Information Generator 314 and Preamble Information Generator 316 may integrate a gateway function into non-limiting embodiments or aspects of the present disclosure to "regenerate" this information again as needed.

The Preamble Information Generator 316 may be configured to regenerate the preamble information and provide or communicate the preamble information to the Exciter Block 108. For example, the T&M information and the preamble information may be (re) generated as defined in the ATSC 3.0 standard. As an example, the T&M information and the preamble information may be generated in the gateway and transmitted in the air as an RF signal, and T&M Information Generator 314 and Preamble Information Generator 316 may integrate a gateway function into non-limiting embodiments or aspects of the present disclosure to "regenerate" this information again as needed.

Referring now to FIG. 4, shown is a block diagram of example components of the Data Converter Block or circuitry (e.g., a data converter, etc.) 106 of the broadcast translator 100 of FIG. 1, according to some non-limiting embodiments or aspects. As shown in FIG. 4, the Data Converter Block 106 may include a Data Router 402, a plurality of ALP groups 404(0), 404(1), . . . 404(N–1), and/or a plurality of BBPs 406(0), 406(1) . . . 406(N–1). The Data Router 402 may be operatively coupled to the Tuner and Demodulator Block 102 and/or the plurality of ALP groups 404(0), 404(1), . . . 404(N–1). The plurality of BBPs 406(0), 406(1) . . . 406(N–1) may be operatively coupled to corresponding ones of the plurality of ALP groups 404(0), 404(1), . . . 404(N–1) and the Exciter Block 108.

The Data Converter Block 106 may be configured to receive the demodulated data from the Tuner and Demodulator Block 102 and/or new signaling information and/or the control and configuration (e.g., the control and configuration information, the new control and configuration information, etc.) from the Data Analysis Block 104. The Data Converter Block 106 may be configured to convert the demodulated data into BBPs and provide or communicate the BBPs to the Exciter Block 108. For example, the Data Router 402 may be configured to receive the demodulated data from the Tuner and Demodulator Block 102 and/or new signaling information and/or the control and configuration (e.g., the control and configuration information, the new control and configuration information, etc.) from the Signaling Generator 304 of the Data Analysis Block 104. The Data Router 402 may be configured to provide the demodulated data to the plurality of ALP groups 404(0), 404(1) . . . 404(N–1) according to or as instructed by the control and configuration information (or the new control and configuration information) generated by the Control and Configuration Generator 306 in the Data Analysis Block 104. For example, the Data Router may determine, based on the control and configuration information, which data goes to which ALP group of the plurality of ALP groups 404(0), 404(1) . . . 404(N–1) to regroup the data and signaling information into the plurality of ALP groups 404(0), 404(1) . . . 404(N–1). The Data Converter Block 106 may be configured to convert the regrouped data and signaling information in the plurality of ALP groups 404(0), 404(1) . . . 404(N–1) into the plurality of BBPs 406(0), 406(1) . . . 406(N–1) according to the ATSC 3.0 standards. The Data Converter Block 106 may be configured to provide or communicate (e.g., directly communicate, etc.) the plurality of BBPs 406(0), 406(1) . . .

406(N–1) to the Exciter Block 108. The plurality of BBPs 406(0), 406(1) . . . 406(N–1) may be provided or communicated to the Exciter Block 108 together with the Preamble information and T&M information regenerated by the Data Analysis block 104, thereby eliminating a need for the information and/or data to be converted and multiplexed into STLTP format before the data transport. The Data Router may use the configuration from the control and configuration generator to decide which input goes to which ALP group, which is referred to as mapping in the ATSC 3.0 standard (A/324 5.4). This mapping is performed by a data switch positioned between the incoming DSTP Streams and the ALP Generator function." The ALP to BBP conversion is also defined in the ATSC 3.0 standard, which is referred to Baseband Packetizer, which is controlled by the control and configuration generator. "The Packetizer functionality accepts ALP packets from the transport layer as described in the ATSC 3.0 standard. All ALP packets are converted to Baseband Packets as described in in the ATSC 3.0 standard. The result of this process is a complete description of the baseband data to be emitted within a specific PLP within an identified Physical Layer frame".

Referring now to FIG. 5, shown is a block diagram of example components of the Exciter Block or circuitry (e.g., the exciter, etc.) 108 of the broadcast translator 100 of FIG. 1, according to some non-limiting embodiments or aspects. As shown in FIG. 5, the Exciter Block 108 may include a Buffer for T&M information 502, a Buffer for Preamble Information 504, a Buffer for BBPs 506, an Input Formatting Block or circuitry 508, a Coded Modulation Block or circuitry 510, Framing/Structure Block or Circuitry 512, a Waveform Generation Block or circuitry (e.g., an ATSC 3.0 Waveform Generation Bock or circuitry, etc.) 514, a Pre-correction Block or circuitry 516, and/or a Digital-to-Analog Converter (DAC) and Up-converter 518. As shown in FIG. 5, the Buffer for T&M information 502 may be operatively coupled to the Data Analysis Block 104, the Coded Modulation Block 510, and/or the Waveform Generation Block 514. The Buffer for Preamble Information 504 may be operatively coupled to the Data Analysis Block 104, the Input Formatting Block 508, the Coded Modulation Block 510, the Framing/Structure Block 512, and/or the Waveform Generation Block 514. The Buffer for BBPs 506, the Input Formatting Block 508, the Coded Modulation Block 510, the Framing/Structure Block 512, the Waveform Generation Block 514, the Pre-correction Block 516, and/or the Digital-to-Analog Converter (DAC) and Up-converter 518 may be operatively connected in sequence one after the other and to antenna 110.

The Exciter Block 108 may be configured to receive the BBP data from the Data Converter Block 106 and/or the Preamble information and the T&M information from the Data Analysis Block 104. Because the Exciter Block 108 may receive the BBP data from the Data Converter Block 106 and/or the Preamble information and the T&M information from the Data Analysis Block 104 in the original formats thereof (e.g., not in STLTP, etc.), the Exciter Block 108 may skip or avoid a process of further data conversion and demultiplexing and can directly use the BBP data from the Data Converter Block 106 and/or the Preamble information and the T&M information from the Data Analysis Block 104. For example, the Buffer for T&M information 502 may be configured to receive the T&M information from the Data Analysis Block 104 in an original format thereof and provide the T&M information to the Coded Modulation Block 510 and/or the Waveform Generation Block 514 without converting the T&M information to a different data format. The Buffer for Preamble Information 504 may be configured to receive the Preamble information from the Data Analysis Block 104 in an original format thereof and provide the Preamble information to the Input Formatting Block 508, the Coded Modulation Block 510, the Framing/Structure Block 512, and/or the Waveform Generation Block 514. The Buffer for BBPs 506 may be configured to receive the BBP data from the Data Converter Block 106 in the BBP format and provide the BBP data to the Input Formatting Block 508.

The Input Formatting Block 508, the Coded Modulation Block 510, the Framing/Structure Block 512, the Waveform Generation Block 514, and/or the Pre-correction Block 516 may process the information and/or data respectively received from the Buffer for T&M information 502, the Buffer for Preamble Information 504, and the Buffer for BBPs 506 to generate a baseband digital signal. The Pre-correction Block 516 may be configured to provide the baseband digital signal to the Digital-to-Analog Converter (DAC) and Up-converter 518. The DAC and Up-converter 518 may be configured to convert the baseband digital signal to an analog signal and to up-convert the analog signal to an RF waveform, which may be broadcast via antenna 110. In this way, the Exciter Block 108 may include many standard exciter functions but omit the STL related demultiplex and reconversion of existing exciters. The Exciter Block 108 may generate the RF signal according to and/or as compatible with the ATSC 3.0 standard in a same or a different frequency as the RF signal received by the Tuner and Demodulator Block 102 and/or broadcast the new RF signal to a same or a different area as the RF signal received by the Tuner and Demodulator Block 102. The new or retransmitted RF signal may have the new signaling information.

Figure 6:
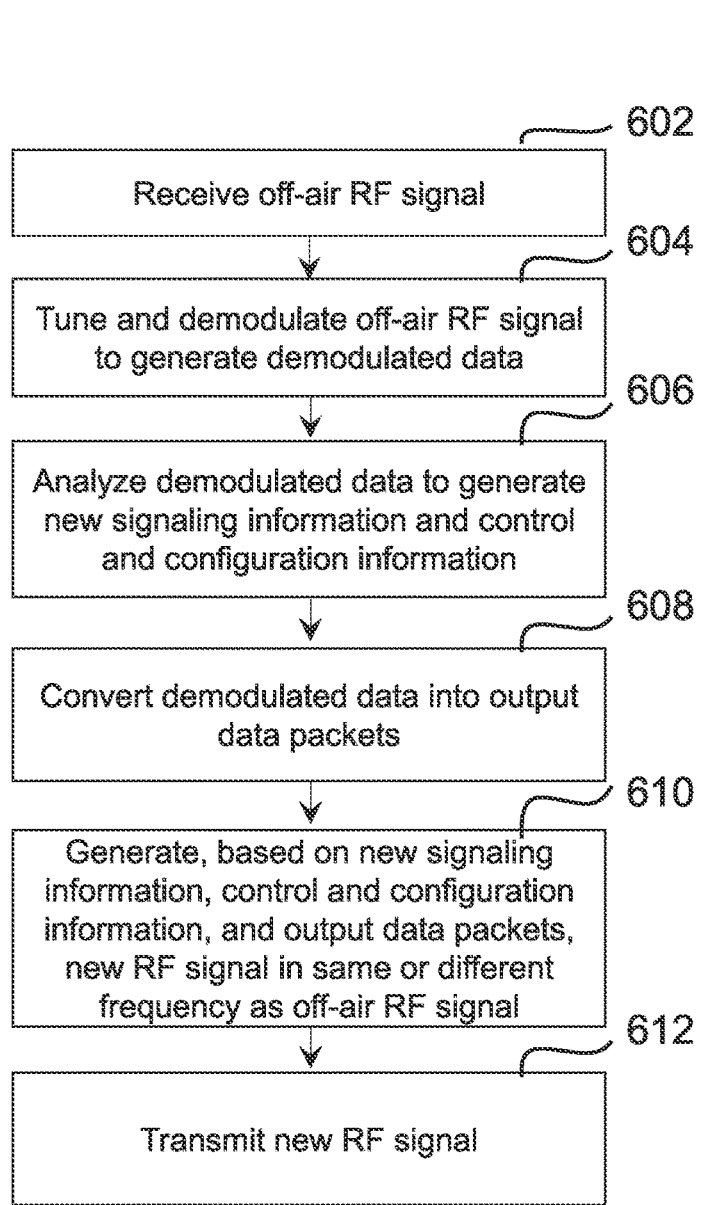
FIG. 6 is a flow diagram of a method for receiving off-air radio-frequency (RF) signals and retransmitting RF signals, according to some non-limiting embodiments or aspects.

Referring now to FIG. 6, shown is a flow diagram of a method 600 for receiving off-air radio-frequency (RF) signals and retransmitting RF signals, according to some non-limiting embodiments or aspects. The steps shown in FIG. 6 are for example purposes only. It will be appreciated that additional, fewer, different, and/or a different order of steps may be used in some non-limiting embodiments or aspects. In some non-limiting embodiments or aspects, a step may be automatically performed in response to the performance and/or completion of a prior step.

As shown in FIG. 6, at step 602, the method 600 includes receiving an off-air RF signal. For example, the of-air RF signal may be received via antenna 101. As an example, the off-air RF signal may include an ATSC 3.0 RF signal.

As shown in FIG. 6, at step 604, the method 600 includes tuning and demodulating the off-air RF signal to generate demodulated data. For example, the Tuner and Demodulator Block or circuitry (e.g., the tuner and demodulator, etc.) 102 may receive an off-air RF signal and output demodulated data. As an example, the demodulated data may be in an ATSC Link Layer Protocol (ALP) format.

As shown in FIG. 6, at step 606, the method 600 includes analyzing the demodulated data to generate new signaling information and control and configuration information. For example, the Data Analysis Block or circuitry (e.g., the data analyzer, etc.) 104 may receive the demodulated data and analyze the demodulated data to generate new signaling information and control and configuration information. As an example, the data analyzer 104 may retrieve the control and configuration information from the demodulated data. In such an example, generating the new signaling information and control and configuration information may include receiving, via user interface 308, user input from a user; and generating, with the data analyzer 104, the control and configuration information based on the user input.

Signaling information included in the off-air RF signal may include at least one of the following: a Link Mapping Table (LMT), a Service List Table (SLT), a service ID, a short service name, a major channel number, a minor channel number, or any combination thereof, and the new signaling information may include at least one of the following: a different LMT than the LMT included in the signaling information, a different SLT than the SLT included in the signaling information, a different service ID than the service ID included in the signaling information, a different short service name than the short service name included in the signaling information, a different major channel number than the major channel number included in the signaling information, a different minor channel number than the minor channel number included in the signaling information, or any combination thereof.

As shown in FIG. 6, at step 608, the method 600 includes converting the demodulated data into output data packets. For example, the Data Converter Block or circuitry (e.g., a data converter, etc.) 106 may receive the demodulated data and convert the demodulated data into output data packets. As an example, the output data packets may include Baseband Packets (BBPs). In such an example, the data converter 106 may convert the demodulated data into output data packets by providing the demodulated data in the ALP format to a plurality of ALP groups according to the control and configuration information and converting the demodulated data in the plurality of ALP groups into the BBPs.

As shown in FIG. 6, at step 610, the method 600 includes generating, based on the new signaling information, the control and configuration information, and the output data packets, a new RF signal in a same or a different frequency as the off-air RF signal. For example, Exciter Block or circuitry (e.g., an exciter, etc.) 108 may receive the new signaling information and the control and configuration information from the data analyzer 104 and the output data packets from the data converter 106 and generate a new RF signal in a same or a different frequency as the off-air RF signal received by the tuner and demodulator 102. As an example, the new RF signal may include the new signaling information and the control and configuration information.

As shown in FIG. 6, at step 612, the method 600 includes transmitting the new RF signal including the new signaling information and the control and configuration information. For example, the new RF signal may be transmitted via antenna 110.

Accordingly, non-limiting embodiments or aspects of the present disclosure may provide for receipt and use of off-air signals as a data source, which may enable broadcasters with a cost-effective solution for accessing content without having to invest in expensive front-end equipment. By utilizing the off-air signal, broadcasters can expand their content offerings and reach a wider audience without incurring significant additional costs.

Non-limiting embodiments or aspects of the present disclosure may provide for modifying the signaling information to reflect changes in information such as service ID, short service name, major channel number, minor channel number, etc., which may enable broadcasters to reuse off-air content without duplicating service ID, short service name, major channel number, minor channel number, etc. when broadcasting in a same or different areas. This feature saves time and resources, making it easier for broadcasters to manage their content and deliver it to their audiences.

Non-limiting embodiments or aspects of the present disclosure may provide a broadcast translator that includes multiple functional blocks that are each integrated within one single device. Compared to fulfilling the same application in a set of devices including a receiver, a gateway, and an exciter, which are all separate devices, because non-limiting embodiments or aspects of the present disclosure may provide an all-in-one device, there may be no external inter-communications among devices, and all data transport may be internal in the same device. Accordingly, non-limiting embodiments or aspects of the present disclosure may eliminate a need to convert data back and forth in different transport protocols for the data to flow through a multi-device system.

Further, because the tuner 202 may be built-in the broadcast translator 100 (e.g., the Tuner and Demodulator Block's output may be provided directly to the Data Converter Block 106), there is no need to convert the demodulated data from its original format (e.g., ALP, etc.), into an IP stream (e.g., ALPTP, etc.) for data to be sent reliably, because the two blocks (the Tuner and Demodulator Block 102 and the Data Converter Block 106) may be physically integrated into one single device and the communication may be completely internal within the one single device, thereby avoiding a need to use a further transport protocol (e.g., ALPTP, etc.) to protect the data in the delivery.

Similarly, because the output of the Tuner and Demodulator Block 102 may be in ALP format, the Data Converter Block 106 can directly route the ALP data into different ALP groups with no need to convert the ALP data back into data source format (e.g., to DSTP, etc.) and then back to ALP format again later. In contrast, existing Broadcast Gateways may perform this back-and-forth data conversion as the existing Broadcast Gateways may only accept standard DSTP data as input, so reconversion may be needed for the existing Broadcast Gateways.

Moreover, to send data from an ATSC 3.0 standard broadcast gateway to an ATSC 3.0 exciter, the data typically needs to be converted into STLTP format, because the gateway and the exciter are usually not located in the same location (one may be in the studio and one may be in the transmitter site). Even if they are collocated, because they are still separate devices, they are designed to follow the ATSC 3.0 standard, so the gateway will have to convert its final output which includes BBP data, Preamble information, and T&M information, into an RTP/UDP/IP stream (such as STLTP format) and use the STL network to transport data to a standard ATSC 3.0 exciter, which may accept only STLTP data as input. But on the exciter side, the exciter has to demultiplex and reconvert the STLTP stream back into BBP data, Preamble information, and T&M information again for further processing, resulting time and resource wasting back-and-forth conversion. Because a Data Converter Block 106 and an Exciter Block 108 may not be only co-located, but also integrated within one single device, non-limiting embodiments or aspects of the present disclosure may have no need to convert the output of the Data Converter Block 106 into an IP stream because there is no STL link needed and all data may flow between functional blocks internally. The guarantee of reliable delivery, reduces the process time and resources and also eliminates the need for ECC and a security system for authentication.

In this way, an "all-in-one" device according to non-limiting embodiments or aspects of the present disclosure may eliminate the need to use multiple devices, thereby decreasing the overall process effort and time, and the system as a whole may be simplified, have fewer breakpoints, be more reliable, and/or have easier installation, setup, and/or maintenance, and/or there may be less likelihood to have data loss or breaches.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A broadcast translator for receiving off-air radio-frequency (RF) signals and retransmitting RF signals, the broadcast translator comprising:

a tuner and demodulator configured to receive an off-air RF signal including signaling information and output demodulated data that includes the signaling information;

a data analyzer operatively coupled to the tuner and demodulator, wherein the data analyzer is configured to receive the demodulated data and analyze the demodulated data to generate new signaling information that is different than the signaling information in the demodulated data and control and configuration information;

a data converter operatively coupled to the tuner and demodulator and the data analyzer, wherein the data converter is configured to receive the demodulated data and convert the demodulated data into output data packets; and an exciter operatively coupled to the data analyzer and the data converter, wherein the exciter is configured to receive the new signaling information and the control and configuration information from the data analyzer and the output data packets from the data converter and generate a new RF signal in a same or a different frequency as the off-air RF signal received by the tuner and demodulator, wherein the new RF signal includes the new signaling information and the control and configuration information.

2. The broadcast translator of claim 1, wherein the signaling information included in the off-air RF signal includes at least one of the following: a Link Mapping Table (LMT), a Service List Table (SLT), a service ID, a short service name, a major channel number, a minor channel number, or any combination thereof, and wherein the new signaling information includes at least one of the following: a different LMT than the LMT included in the signaling information, a different SLT than the SLT included in the signaling information, a different service ID than the service ID included in the signaling information, a different short service name than the short service name included in the signaling information, a different major channel number than the major channel number included in the signaling information, a different minor channel number than the minor channel number included in the signaling information, or any combination thereof.

3. The broadcast translator of claim 2, wherein the data analyzer is configured to generate the control and configuration information by retrieving the control and configuration information from the demodulated data, and wherein the data analyzer is configured to provide the control and configuration information to the data converter.

4. The broadcast translator of claim 2, further comprising:
a user interface configured to user input from a user, wherein the data analyzer is configured to generate the control and configuration information based on the user input, and wherein the data analyzer is configured to provide the control and configuration information to the data converter.

5. The broadcast translator of claim 1, wherein the demodulated data is in an Advanced Television Systems Committee (ATSC) Link Layer Protocol (ALP) format, and wherein the tuner and demodulator is configured to provide the demodulated data directly to the data analyzer and the data converter in the ALP format.

6. The broadcast translator of claim 5, wherein the output data packets include Baseband Packets (BBPs), wherein the data converter is configured to provide the demodulated data in the ALP format to a plurality of ALP groups according to the control and configuration information, wherein the data converter is configured to convert the demodulated data in the plurality of ALP groups into the BBPs, and wherein the data converter is configured to provide the BBPs directly to the exciter.

7. The broadcast translator of claim 1, wherein the off-air RF signal includes an Advanced Television Systems Committee (ATSC) 3.0 RF signal.

8. The broadcast translator of claim 1, wherein the tuner and demodulator include at least one of the following: at least one antenna input, an input filter, a pre-amplifier configured to amplify the off-air RF signal, a tuner circuit, or any combination thereof.

9. The broadcast translator of claim 1, wherein each of the tuner and demodulator, the data analyzer, the data converter, and the exciter are integrated within one single device.

10. The broadcast translator of claim 1, further comprising:
an antenna configured to at least one of receive the off-air RF signal, transmit the new RF signal, or any combination thereof.

11. A method for receiving off-air radio-frequency (RF) signals and retransmitting RF signals, comprising:
receiving an off-air RF signal that includes the signaling information;
tuning and demodulating the off-air RF signal to generate demodulated data that includes the signaling information;
analyzing the demodulated data to generate new signaling information that is different than the signaling information in the demodulated data and control and configuration information;
converting the demodulated data into output data packets; and
generating, based on the new signaling information, the control and configuration information, and the output data packets, a new RF signal in a same or a different frequency as the off-air RF signal,
wherein the new RF signal includes the new signaling information and the control and configuration information.

12. The method of claim 11, wherein the signaling information included in the off-air RF signal includes at least one of the following: a Link Mapping Table (LMT), a Service List Table (SLT), a service ID, a short service name, a major channel number, a minor channel number, or any combination thereof, and wherein the new signaling information includes at least one of the following: a different LMT than the LMT included in the signaling information, a different SLT than the SLT included in the signaling information, a different service ID than the service ID included in the signaling information, a different short service name than the short service name included in the signaling information, a different major channel number than the major channel number included in the signaling information, a different minor channel number than the minor channel number included in the signaling information, or any combination thereof.

13. The method of claim 12, wherein analyzing the demodulated data to generate the new signaling information and control and configuration information includes retrieving the control and configuration information from the demodulated data.

14. The method of claim 12, wherein analyzing the demodulated data to generate the new signaling information and the control and configuration information further includes:
receiving user input from a user; and
generating the control and configuration information based on the user input.

15. The method of claim 11, wherein the demodulated data is in an Advanced Television Systems Committee (ATSC) Link Layer Protocol (ALP) format.

16. The method of claim 15, wherein the output data packets include Baseband packets (BBPs), wherein converting the demodulated data into output data packets includes providing the demodulated data in the ALP format to a plurality of ALP groups according to the control and configuration information and converting the demodulated data in the plurality of ALP groups into the BBPs.

17. The method of claim 11, wherein the off-air RF signal includes an Advanced Television Systems Committee (ATSC) 3.0 RF signal.

18. The method of claim 11, further comprising:
transmitting the new RF signal including the new signaling information and the control and configuration information.

19. A system for receiving off-air radio-frequency (RF) signals and retransmitting RF signals, the system comprising:
a tuner and demodulator configured to receive an off-air ATSC 3.0 RF signal including signaling information and output demodulated data that includes the signaling information in an ATSC Link Layer Protocol (ALP) format;
a data analyzer operatively coupled to the tuner and demodulator, wherein the data analyzer is configured to receive the demodulated data in the ATSC ALP format and analyze the demodulated data in the ATSC ALP format to generate new signaling information that is different than the signaling information in the demodulated data and control and configuration information;
a data converter operatively coupled to the tuner and demodulator and the data analyzer, wherein the data converter is configured to receive the demodulated data in the ATSC ALP format and convert the demodulated data into Baseband Packets (BBPs); and
an exciter operatively coupled to the data analyzer and the data converter, wherein the exciter is configured to receive the new signaling information and the control and configuration information from the data analyzer and the BBPs from the data converter and generate a new ATSC 3.0 RF signal in a same or a different frequency as the off-air ATSC 3.0 RF signal received by the tuner and demodulator, wherein the new ATSC 3.0 RF signal includes the new signaling information and the control and configuration information.

20. The system of claim 19, wherein each of the tuner and demodulator, the data analyzer, the data converter, and the exciter are integrated within one single device.

* * * * *